US008365167B2

(12) United States Patent
Beaty et al.

(10) Patent No.: US 8,365,167 B2
(45) Date of Patent: Jan. 29, 2013

(54) PROVISIONING STORAGE-OPTIMIZED VIRTUAL MACHINES WITHIN A VIRTUAL DESKTOP ENVIRONMENT

(75) Inventors: Kirk A. Beaty, Goldens Bridge, NY (US); Andrzej Kochut, Elmsford, NY (US); Daniel Salinas, Farmington Hills, MI (US); Charles Otto Schulz, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 1292 days.

(21) Appl. No.: 12/103,606

(22) Filed: Apr. 15, 2008

(65) Prior Publication Data

US 2009/0260007 A1 Oct. 15, 2009

(51) Int. Cl.
*G06F 9/48* (2006.01)
(52) U.S. Cl. ............................................. 718/1; 717/172
(58) Field of Classification Search ........................ None
See application file for complete search history.

(56) References Cited

U.S. PATENT DOCUMENTS

| | | | | | |
|---|---|---|---|---|---|
| 5,574,878 | A | * | 11/1996 | Onodera et al. | 711/207 |
| 7,356,679 | B1 | * | 4/2008 | Le et al. | 713/1 |
| 7,865,893 | B1 | * | 1/2011 | Omelyanchuk et al. | 718/1 |
| 7,899,788 | B2 | * | 3/2011 | Chandhok et al. | 707/640 |
| 8,082,406 | B1 | * | 12/2011 | Singh et al. | 711/162 |
| 2004/0221290 | A1 | * | 11/2004 | Casey et al. | 718/104 |
| 2005/0138623 | A1 | * | 6/2005 | Fresko | 718/102 |
| 2005/0198303 | A1 | * | 9/2005 | Knauerhase et al. | 709/227 |
| 2005/0246575 | A1 | * | 11/2005 | Chen et al. | 714/6 |
| 2007/0174658 | A1 | * | 7/2007 | Takamoto et al. | 714/4 |
| 2007/0214350 | A1 | * | 9/2007 | Isaacson | 713/2 |
| 2007/0234356 | A1 | * | 10/2007 | Martins et al. | 718/1 |
| 2007/0260831 | A1 | * | 11/2007 | Michael et al. | 711/162 |
| 2008/0034364 | A1 | * | 2/2008 | Lam et al. | 718/1 |

OTHER PUBLICATIONS

Zhao, Ming etal., Distributed File Support for Virtual Machines in Grid Computing, 2004, IEEE, pp. 202-211.*
Nishimura, H. etal., Virtual Clusters on the Fly-Fast Scalable, and Flexible installation, 2007, IEEE, 8 pages.*
Krsul, I., etal., VMPlants: Providing and Managing Virtual Machine Execution Environments for Grid Computing, 2004, IEEE, 12 pages.*

* cited by examiner

*Primary Examiner* — Eric Coleman
(74) *Attorney, Agent, or Firm* — Yee & Associates, P.C.; Anne Dougherty

(57) ABSTRACT

A computer implemented method, a computer program product, and data processing system clone virtual machines in a virtual desktop environment. A request to clone a new virtual machine is intercepted, wherein the request was initially sent to a virtual management server. Responsive to intercepting the request, the new virtual machine is cloned from a snapshot of a master virtual machine. A delta file is created for the new virtual machine, wherein the delta file includes a base disk reference and a copied delta file. The new virtual machine is configured to read a base disk image from a snapshot of the master virtual machine. The new virtual machine is configured to write data to the copied delta file in the delta file.

25 Claims, 7 Drawing Sheets

PROVISIONING STORAGE-OPTIMIZED VIRTUAL MACHINES WITHIN A VIRTUAL DESKTOP ENVIRONMENT

BACKGROUND OF THE INVENTION

1. Field of the Invention

The present invention relates generally to a computer implemented method, a computer program product, and a data processing system. More specifically, the present invention relates to a computer implemented method, a computer program product, and a data processing system for provisioning virtual machines within a virtual desktop environment.

2. Description of the Related Art

There is a broad industry initiative toward moving away from the traditional personal computer on every desktop to a model wherein each person's operating system and applications are hosted in the datacenter, and the user can attach to this remotely using a simple user interface device on his desktop. One of the solution concepts for this initiative is a "virtual desktop" wherein each user is provided a private virtual machine hosted on a server in the datacenter. One of the promised values of this model is efficient use of computing resources by deploying only those virtual machines needed to support the users logged on at any one moment. The best efficiency of resource usage can be achieved by deploying client virtual machines 'just in time' to meet the user demand. The efficiency of 'just in time' deployment is limited by the time in which it takes to deploy a new client.

These hosting datacenters are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocable resources include one or more architecturally distinct processors and their interrupt management area, regions of system memory, and input/output (I/O) adapter bus slots. The partition's resources are represented by the platform's firmware to the operating system image.

Each distinct operating system or image of an operating system running within a platform is protected from each other such that software errors on one logical partition cannot affect the correct operation of any of the other partitions. This protection is provided by allocating a disjointed set of platform resources to be directly managed by each operating system image and by providing mechanisms for ensuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocable resources within the platform.

With respect to hardware resources in a logical partitioned data processing system, these resources are shared disjointly among various partitions. These resources may include, for example, input/output (I/O) adapters, memory DIMMs, non-volatile random access memory (NVRAM), and hard disk drives. Each partition within a logical partitioned data processing system may be booted and shut down over and over without having to power-cycle the entire data processing system.

A second aspect of the Virtual Desktop value proposition is associated with the cost of storing the user's client image (i.e. his boot disk or C: drive in the Windows vernacular). Desktop PC storage typically has a much lower cost per byte than datacenter storage. This difference is typically up to 10 times greater for datacenter storage than for desktop personal computer storage and can be as high as 1000 times greater for datacenter storage. This storage cost is a key contributor to the cost model for Virtual Desktop, and therefore methods which can mitigate the cost overhead of storing the user's environment and data in the datacenter has a dramatic impact on the competitiveness of Virtual Desktop.

SUMMARY OF THE INVENTION

A computer implemented method, a computer program product, and data processing system clone virtual machines in a virtual desktop environment. A request to clone a new virtual machine is intercepted, wherein the request was initially sent to a virtual management server. Responsive to intercepting the request, the new virtual machine is cloned from a snapshot of a master virtual machine. A delta file is created for the new virtual machine, wherein the delta file includes a base disk reference and a copied delta file. The new virtual machine is configured to read a base disk image from a snapshot of the master virtual machine. The new virtual machine is configured to write data to the copied delta file in the delta file.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
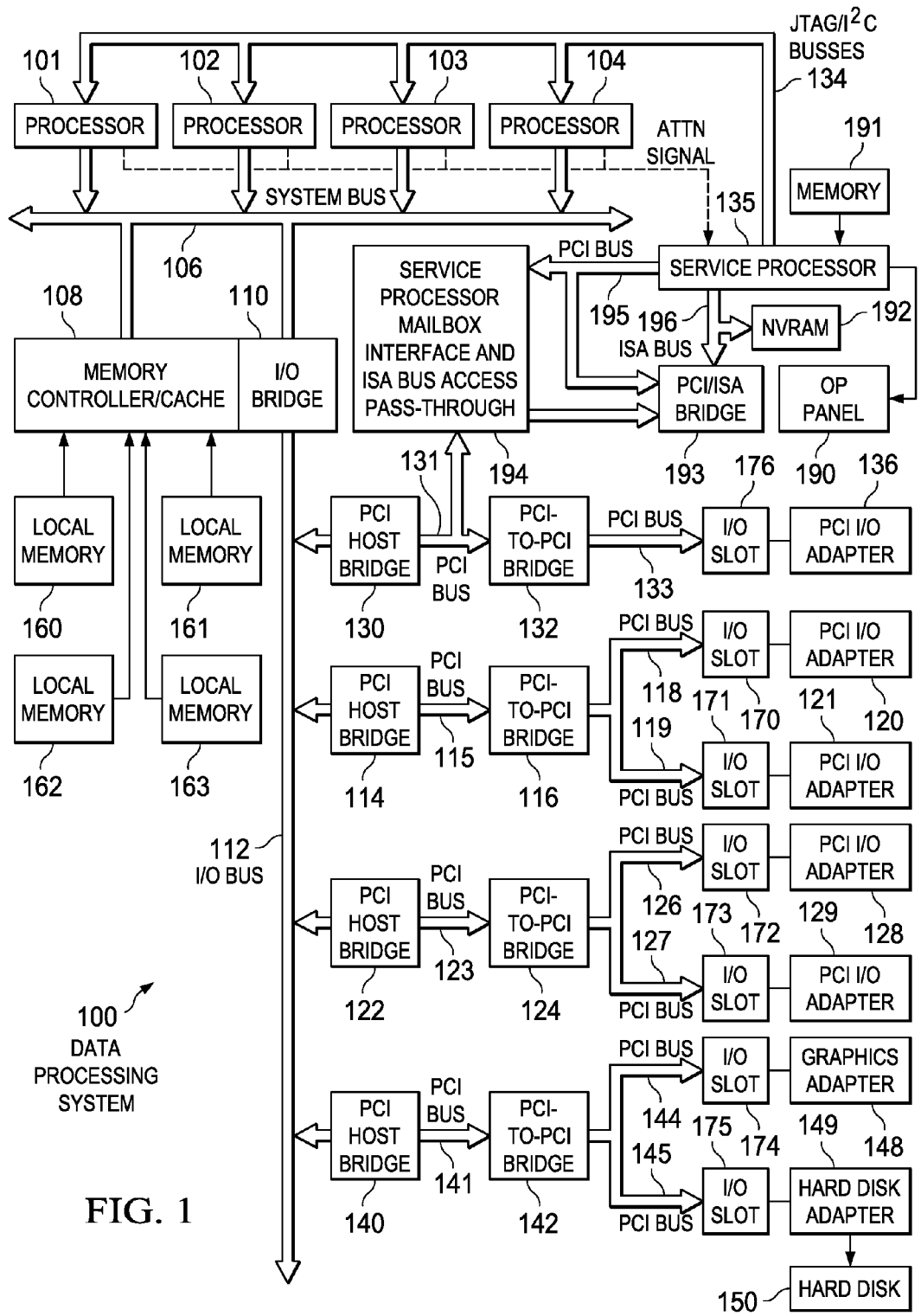
FIG. 1 is a block diagram of a data processing system in which illustrative embodiments may be implemented.

With reference now to the figures, and in particular with reference to FIG. 1, a block diagram of a data processing system in which illustrative embodiments may be implemented is depicted. Data processing system 100 may be a symmetric multiprocessor (SMP) system including processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules (DIMMs). DIMMs are not normally assigned on a per DIMM basis to partitions. Instead, a partition gets a portion of the overall memory seen by the platform. For example, in processor 101, some portion of memory from local memories 160, 161, 162, and 163, and I/O adapters 120, 128, and 129 may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices, such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through 194 and PCI-to-PCI bridge 132. Service processor mailbox interface and ISA bus access pass-through 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101, 102, 103, and 104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local (host) memories 160, 161, 162, and 163. Service processor 135 then releases host processors 101, 102, 103, and 104 for execution of the code loaded into local memory 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art appreciate that the hardware depicted in FIG. 1 may vary. For example, other peripheral devices, such as optical disk drives and the like, also may be used in addition to or in place of the hardware depicted. The depicted example is not meant to imply architectural limitations with respect to illustrative embodiments.

Figure 2:
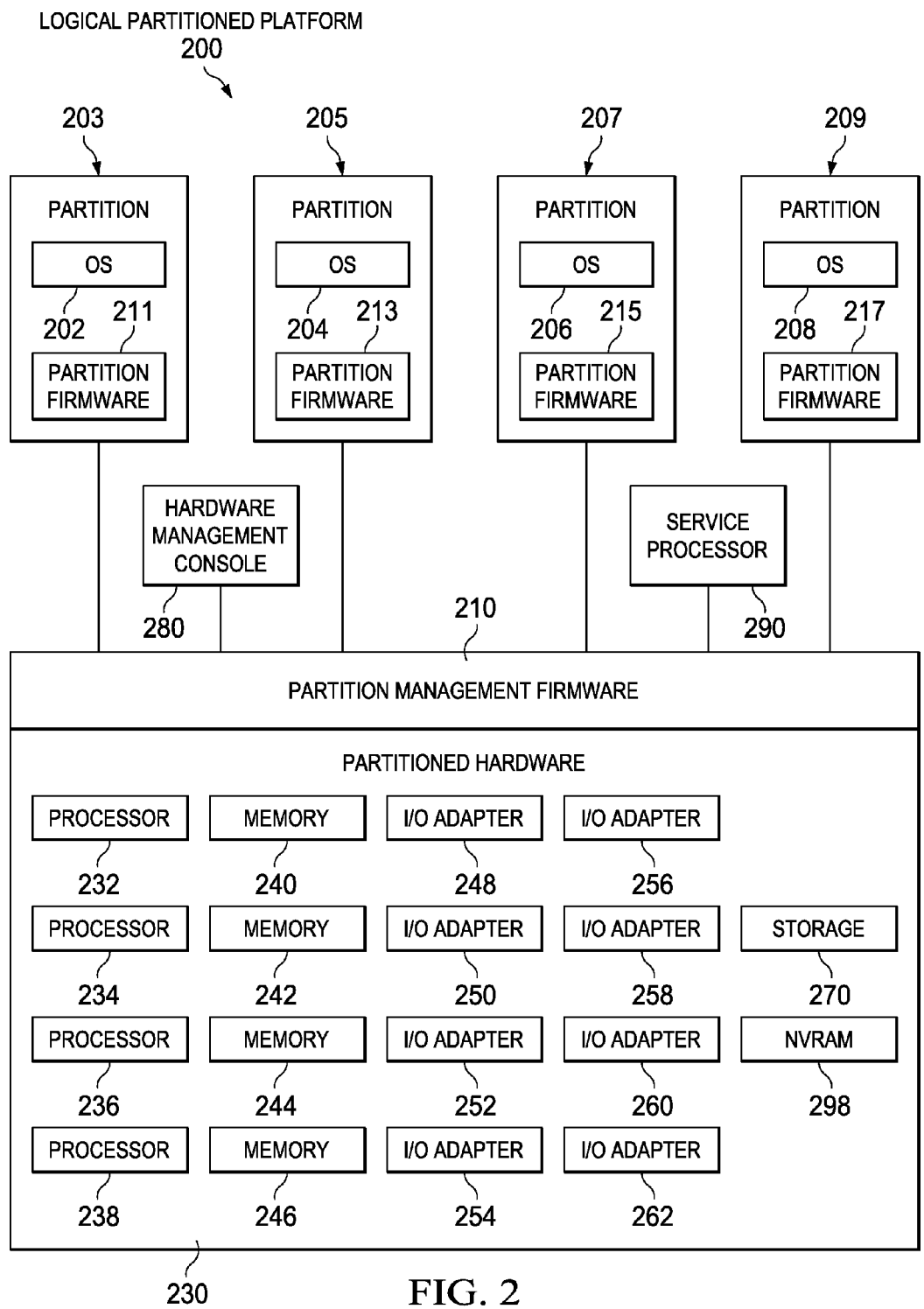
FIG. 2 is a block diagram of an exemplary logical partitioned platform depicted in which illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform management firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, and a storage unit 270. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The illustrative embodiments provide computer implemented methods, computer program products, and data processing systems for provisioning new virtual machines in a virtual desktop environment. The users in a typical business environment typically fall into a few similar classes. The personal computing needs of the individual members in each of these classes are very similar. Therefore in a Virtual Desktop environment, the virtual machines representing the personal computers of each user in a class are nearly indistinguishable. However, each of these personal computers needs a multi-gigabyte disk to store the operating system, applications, and data for the user. The bulk of the data stored on these disks are identical representing the operating system and application text which is the same for all the members of a class. The illustrative embodiments disclosed herein use a virtual machine snapshot capability of the underlying virtualization environment to allow all the members of a single class of users to share a single copy of those portions of their boot disk, typically the /C: drive, which are the same.

A snapshot is taken of a master virtual machine. The master virtual machine is not running when the snapshot is taken. At the time of the snapshot, the boot disk image of that master virtual machine is made read-only in a state at the time of the snapshot.

When a client virtual machine is subsequently created, all changes to the virtual machine image, such as changes to log files, registry, user files, and the like, become necessary. These changes are captured in the delta file so that the changes do not alter the initial state of the original snapshot disk image. The original initial snapshot disk image, therefore, remains fixed in its initial state as of the time of the snapshot.

Since the virtual machine preferentially refers to the delta file, the virtual machine reads the latest versions of data which has changed since the snapshot from the delta file and read data which has not changed since the snapshot from the original disk image. Since the original initial snapshot disk image of the virtual machine does not change after the initial snapshot, this model is easily extended to many virtual machines sharing a single base initial snapshot disk image, with each virtual machine having its own delta file to collect that virtual machine's unique changes.

Setting up the master virtual machine environment is initially performed in a series of steps. The master virtual machine is prepared for each class of users. This preparation can include, but is not limited to, installing, patching, and configuring the operating system and applications needed by this class of users. The Master virtual machine is then shut down, and an initial snapshot is taken of the virtual machine.

A new client Virtual Desktop virtual machine can then be cloned from the Master virtual machine. A skeleton virtual machine is initially created. The skeleton virtual machine has an initial configuration like the Master virtual machine with the exception that the skeleton virtual machine does not yet contain a boot disk. The Master virtual machine delta file is copied to the new client virtual machine. The client virtual machine is then configured to refer to the Master virtual machine initial snapshot disk image as the client virtual machine's base disk image and to the copied Delta file as the client virtual machine's delta file image.

The new client virtual machine now uses the Master virtual machine's initial snapshot disk image for reads and uses the client virtual machine's own local delta file for writes. Thus, all new client virtual machines made with this technique is unique as to their respective delta files. However, a client virtual machine shares all other data that has not been written to the respective Delta file of that client's virtual machine with every other client's virtual machine and with the Master virtual machine.

Figure 3:
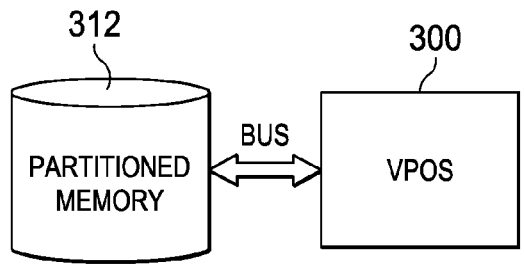
FIG. 3 is a simplified data flow shown between a virtual partitioned operating system and an allocated memory for that virtual partitioned operating system according to the prior art.

Referring now to FIG. 3, a simplified data flow is shown between a virtual partitioned operating system and an allocated memory for that virtual partitioned operating system according to the prior art. Virtual partitioned operating system 300 can be one of partitions 203, 205, 207, and 209 of FIG. 2. Virtual partitioned operating system 300 can be a virtual desktop machine operating on a remote client.

When virtual partitioned operating system 300 is created, partitioned memory 312 is allocated to virtual partitioned operating system 300. Partitioned memory 312 can be local memory 160, 161, 162, and 164 of FIG. 1. Partitioned memory 312 contains an operating system, such as operating systems 202, 204, 206, and 208 of FIG. 2, as well as partition firmware, such as partition firmware 211, 213, 215, and 217 of FIG. 2.

Partitioned memory 312 contains all the necessary files for the execution of partitioned operating system 300. Partitioned memory 312, therefore, typically must be a multi-gigabyte storage to store the operating system, applications, and data for the user.

A logical partitioned platform, such a logical partitioned platform 200 of FIG. 2, typically contains several copies of virtual partitioned operating system 300. Each of the copies of virtual partitioned operating system 300 uses a multi-gigabyte storage to store the operating system, applications, and data for the user of that copy of virtual partitioned operating system 300. Even though the bulk of the data stored on these disks are identical, a separate partitioned memory 312 is required for each copy of the virtual partitioned operating system 300 to capture changes made by the user of that copy of virtual partitioned operating system 300 to files, such as, for example, but not limited to, log files, registry changes, and saves of user files. Thus, virtual partitioned operating system 300 reads data from, and writes data to partitioned memory 312.

Figure 4:
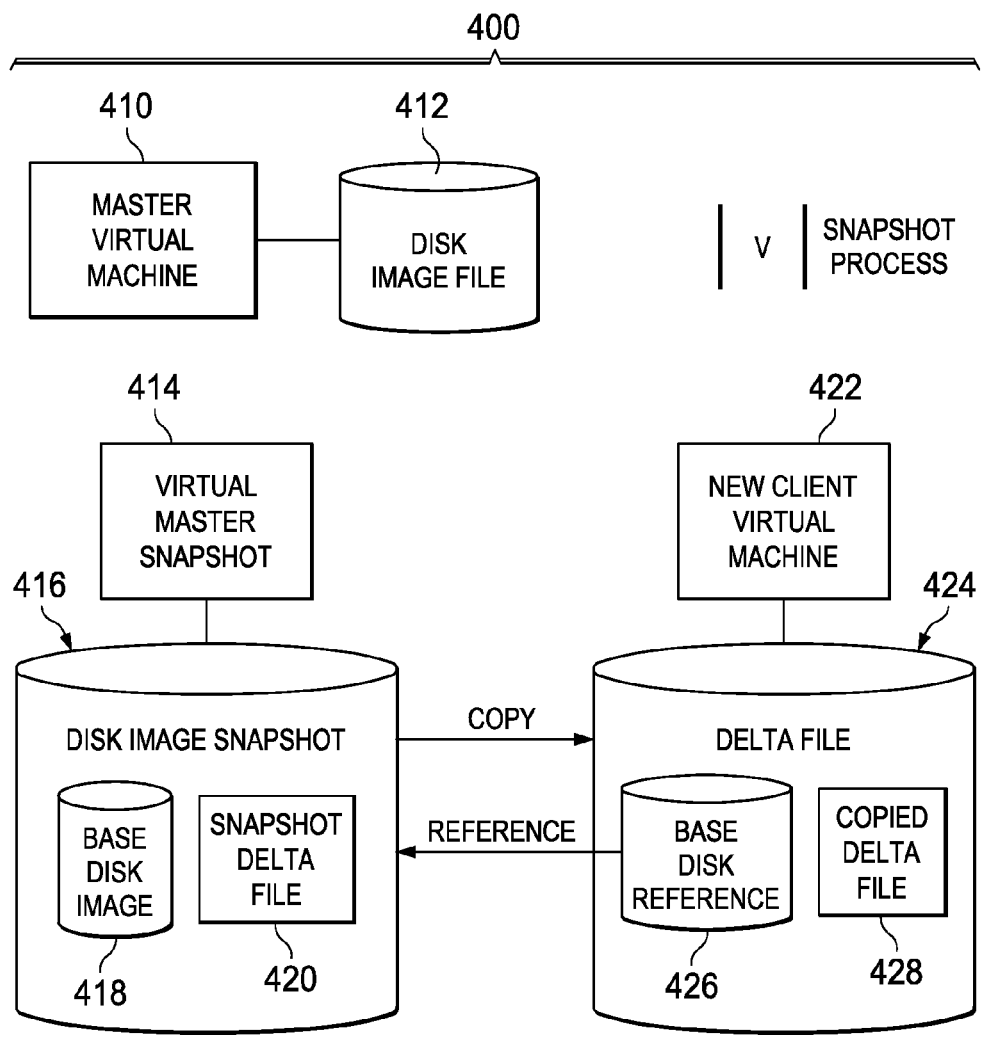
FIG. 4 is a simplified data flow shown between a virtual partitioned operating system and an allocated memory for that virtual partitioned operating system according an illustrative embodiment.

Referring now to FIG. 4, a simplified data flow is shown between a virtual partitioned operating system and an allocated memory for that virtual partitioned operating system according to an illustrative embodiment. Logical partitioned platform 400 can be logical partitioned platform 200 of FIG. 2.

Logical partitioned platform 400 contains master virtual machine 410, which is a virtual machine such as virtual machine virtual partitioned operating system 300 of FIG. 3. The master virtual machine 410 has an associated disk image file 412 which consists of a boot device for master virtual machine 410. In order to provision a new client virtual machine, virtual machine snapshot 414 of master virtual machine 410, and disk image snapshot 416 are created.

A new client virtual machine 422 can then be cloned from virtual machine snapshot 414. New client virtual machine 422 has an initial configuration like the master virtual machine 410 with the exception that new client virtual machine 422 does not yet contain a boot disk, such as that contained in base disk image 418.

Delta file 424 is then created from disk image snapshot 416. Delta file 424 is a disk image for new client virtual machine 422. Delta file 424 consists of base disk reference 426 and copied delta file 428. Base disk reference 426 is a reference to base disk image 418. Copied delta file 428 is a copy of snapshot delta file 420. Changes to the disk image of new client virtual machine 422, such as changes to log files, registry changes, saves of user files, and the like, are captured in copied delta file 428. Changes captured in copied delta file 428 do not alter the initial state of disk image snapshot 416. Disk image snapshot 416 therefore remains fixed in its initial state as of the creation time of disk image snapshot 416.

Copied delta file 428 is initially empty upon allocation to new client virtual machine 422. Copied delta file 428 takes up little or no real physical storage. Copied delta file 428 contains only those changes which a local virtual desktop has made to its file system new client virtual machine 422 refers to base disk image 418 for any files that have not been modified. Thus, copied delta file 428 is typically a small fraction of the size of the master virtual machine 410.

Figure 5:
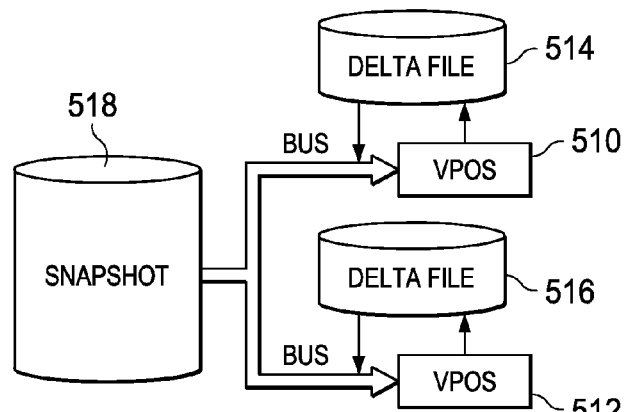
FIG. 5 is a simplified data flow shown between virtual partitioned operating systems and an allocated memory for those virtual partitioned operating systems according an illustrative embodiment.

Referring now to FIG. 5, a simplified data flow is shown between virtual partitioned operating systems and an allocated memory for those virtual partitioned operating systems according to an illustrative embodiment. Virtual partitioned operating system 510 and 512 are virtual partitioned operating systems, such as virtual partitioned operating system 400 of FIG. 4.

Delta file 514 is allocated to virtual partitioned operating system 510. Delta file 516 is allocated to virtual partitioned operating system 512. Delta files 514 and 516 are delta files such as delta file 412 of FIG. 4. Changes to virtual partitioned operating system 510 are captured in the delta file 514. Changes to virtual partitioned operating system 512 are captured in the delta file 516.

Both virtual partitioned operating system 510 and virtual partitioned operating system 512 read from snapshot 518. Snapshot 518 is disk image snapshot 416 of FIG. 4. Virtual partitioned operating systems 510 and 512 both have identical requirements for the boot disk image and bootable files.

Virtual partitioned operating systems 510 preferentially refer to delta file 514, while virtual partitioned operating system 512 preferentially refers to delta file 516. Therefore, virtual partitioned operating systems 510 and 512 each read respective versions of changed data from their respective delta files 514 and 516. Virtual partitioned operating systems 510 and 512 read data which has not changed since the creation of snapshot 518 from snapshot 518.

Figure 6:
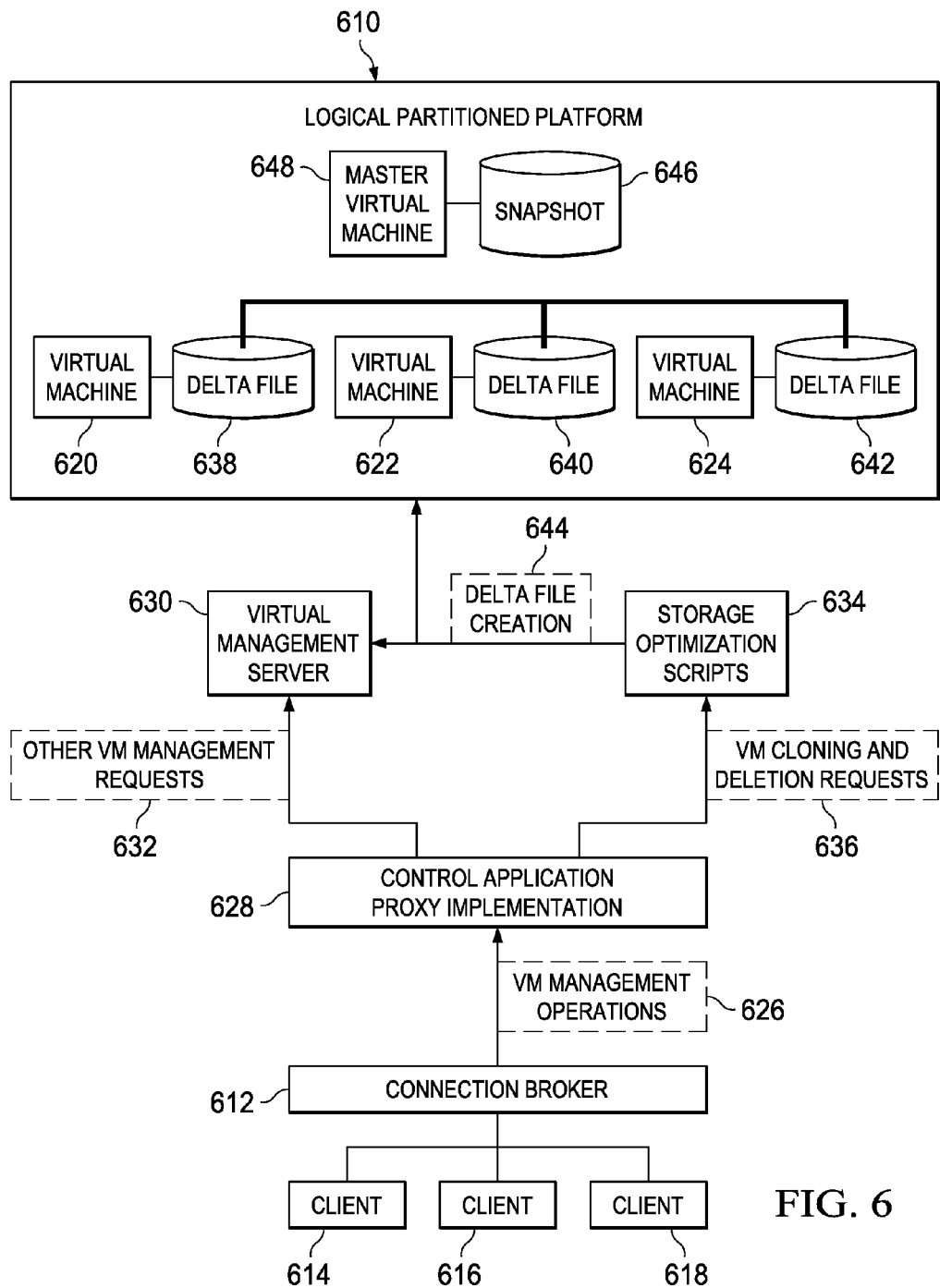
FIG. 6 is a data flow between system components shown according to an illustrative embodiment.

Referring now to FIG. 6, a data flow between system components is shown according to an illustrative embodiment. Logical partitioned platform 610 is a logically partitioned platform, such as logical partitioned platform 200 of FIG. 2, executing on a data processing system, such as data processing system 100 of FIG. 1.

Connection broker 612 manages user connections between clients 614, 616, and 618 and their respective virtual machines 620, 622, and 624 executing on logical partitioned platform 610. Connection broker 612 is a data processing system that manages incoming connection requests, and allocates available virtual machines to the requesting client. Connection broker 612 can also authenticate clients 614, 616, and 618 and direct or assign clients 614, 616, and 618 to one of virtual machines 620, 622, and 624 according to a predefined policy, group membership, or other criteria. Connection broker 612 can also control the state of the virtual desktops 620, 622, and 624, for example, but not limited to, powering the virtual machine on and off, and suspending and resuming the virtual machine. Connection broker 612 can also track the connection status of clients 614, 616, and 618 to their assigned virtual machines, for example, but not limited to, identifying whether a client is currently logged onto a virtual machine, or identifying to which of clients 614, 616, and 618 a virtual machine has been assigned. In one illustrative embodiment, connection broker 612 is a Virtual Desktop Manager®, available from VMWare, Inc.

Virtual machines 620, 622, and 624 are virtual partitioned operating systems within a logical partitioned platform, logical partitioned platform 400 of FIG. 4. Virtual machines 620, 622, and 624 are executed within a partition, such as one of partitions 203, 205, 207, and 209 of FIG. 2.

Connection broker 612 receives virtual machine management operations 626 from one of clients 614, 616, and 618. Virtual machine management operations 626 are system calls to virtual management server 630. The system calls can be either calls to allocate or delete a virtual machine, such as one of virtual machines 620, 622, and 624 for one of clients 614, 616, and 618, or the system calls can be other system calls related to the operation and management of logical partitioned platform 610. Other system calls can include, for example, authenticating clients, controlling the state of the virtual machines, and tracking the connection status of clients to their assigned virtual machines. In one illustrative embodiment, the calls can be of the standard VMware® Infrastructure SDK.

Control application proxy implementation 628 is a software component that intercepts virtual machine management operations 626 sent from connection broker 612. Control application proxy implementation 628 handles virtual machine management operations 626 as required for provisioning of virtual machines 620, 622, and 624 and then returns the expected result to the caller. Virtual machine management operations 626 can include allocating available virtual machines to the requesting client, authenticating clients, directing or assigning clients to a virtual machine, controlling the state of the virtual machines, tracking the connection status of clients to their assigned virtual machines, and requesting the cloning or deletion of new virtual machines.

Control application proxy implementation 628 acts as both a target and an initiator of VI SDK traffic to connection broker 612 and virtual management server 630. To the virtual management server 630, it appears that virtual management server 630 communicates directly to connection broker 612. To connection broker 612, it appears that connection broker 612 communicates directly to virtual management server 630. By maintaining this appearance of transparency between the virtual management server 630 and the connection broker 612, control application proxy implementation 628 can introduce any new functions desired between the virtual management server 630 and the connection broker 612. In this case, the new function is translating virtual machine clone commands from the virtual management server 630 into virtual machines and delta files, such as virtual partitioned platform 400 and delta file 424 of FIG. 4.

Virtual machine management operations 626 that are not relevant to the creation or deletion of virtual machines 620, 622, and 624 are transparently passed through to virtualization management server 630. That is, other virtual machine management requests 632 are passed through to virtualization management server 630 unchanged.

Virtual machine management operations 626 that request that a new desktop virtual machine be created, such as one of virtual machines 620, 622, and 624, or that an existing desktop virtual machine be deleted, such as one of virtual machines 620, 622, and 624, triggers Storage Optimization Scripts 634. That is, virtual machine cloning and deletion requests 636 are intercepted by Control application proxy implementation 628 and routed to Storage Optimization Scripts 634.

In one illustrative embodiment for VMware® Infrastructure, Control application proxy implementation 628 intercepts the following VMware® API calls: 1) CloneVM Task—this VMware® API call is redirected to a Storage Optimization Script which creates a desktop virtual machine with a skeleton delta file; 2) DestroyVM Task—this VMware® API call is redirected to a Storage Optimization Script that properly cleans-up the skeleton delta file enabled desktop virtual machine; 3) WaitForUpdates, CheckForUpdates, CancelWaitForUpdates, QueryOptions, CreateFilter, DestroyPropertyFilter—these VMware® API calls are redirected to Storage Optimization Scripts which obtain proper status of the Clone process of the skeleton delta file enabled desktop virtual machine.

Storage Optimization Scripts 634 are software processes that execute in conjunction with Control application proxy implementation 628 that oversees the cloning of new virtual desktops, and the deletion of existing virtual desktops. Responsive to receiving a management operation to create a new desktop virtual machine, Storage Optimization Scripts 634 creates one of delta files 638, 640, and 642 for allocation to the new virtual machine. Delta files 638, 640, and 642 are delta files, such as delta file 424 of FIG. 4. An indication of delta file creation 644 is sent to virtual management server 630.

Virtual management server 630 is the central control node for configuring, provisioning, and managing the virtual machine environments. Virtual management server 630 provisions a partition within Logical partitioned platform 610, which can be one of partitions 203, 205, 207, and 209 of FIG. 2, in which to execute a new virtual machine, which is one of virtual machines 620, 622, and 624. The new delta file, which is one of delta files 638, 640, and 642, is also provisioned to the new virtual machine.

Instead of virtual management server 630 provisioning an entire operating system, such as one of operating systems 202, 204, 206, and 208 of FIG. 2, to the new desktop virtual machine, virtualization management server points virtual machines 620, 622, and 624 to a snapshot 646 of master virtual machine 648. Master virtual machine 648 is a virtual machine that contains any needed software by a virtual machine for a particular group of clients. Unlike virtual machines 620, 622, and 624, master virtual machine 648 contains the boot disk image and bootable files. Snapshot 646 is a snapshot of master virtual machine 648, such as virtual machine snapshot 414 of FIG. 4.

When virtual machines 620, 622, and 624 are subsequently started, virtual machines 620, 622, and 624 by necessity need to write files, such as, for example, but not limited to, log files, registry changes, and saves of user files. These new writes are captured in delta files 638, 640, and 642. Therefore, the new writes do not change the state of snapshot 646 which remains fixed in the same state as of the time of the snapshot 646. Since virtual machines 620, 622, and 624 preferentially refer to the delta files 638, 640, and 642, virtual machines 620, 622, and 624 read the latest versions of data which has changed since the creation of Snapshot 646 from the associated one of delta files 638, 640, and 642. Virtual machines 620, 622, and 624 read data which has not changed since the creation of Snapshot 646 from Snapshot 646.

Figure 7:
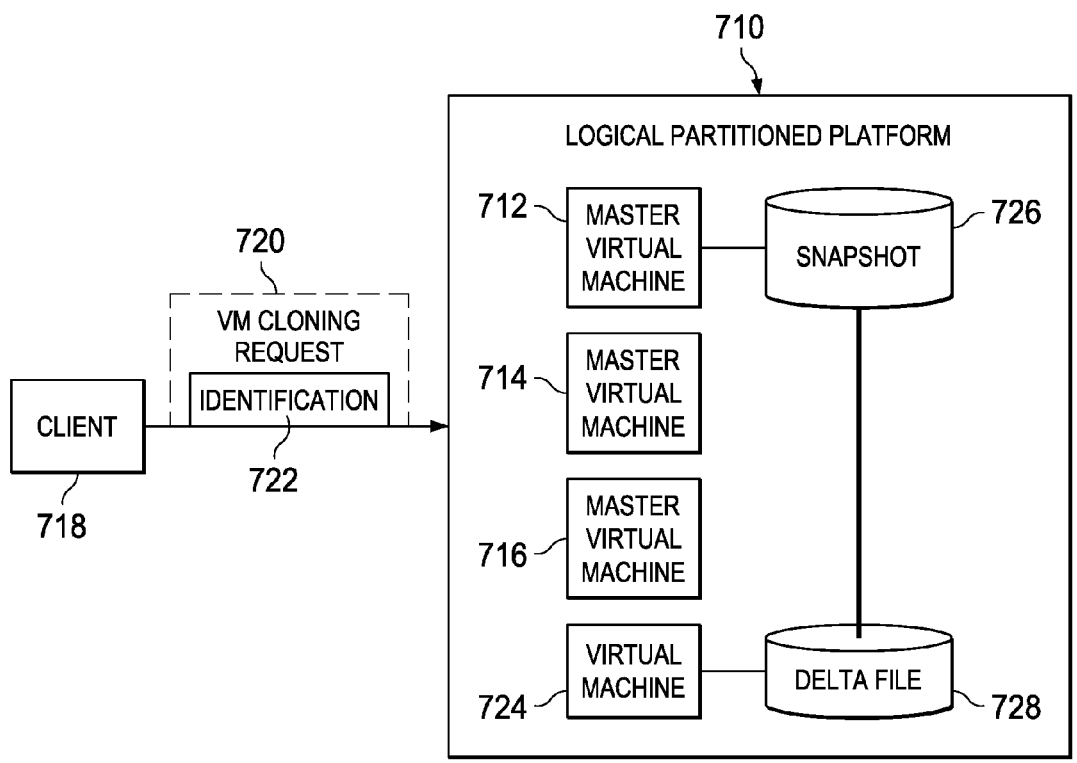
FIG. 7 is a data flow between system components for allocating virtual machines to clients based on client identification shown according to an illustrative embodiment.

Referring now to FIG. 7, a data flow between system components for allocating virtual machines to clients based on client identification is shown according to an illustrative embodiment. Logical partitioned platform 710 is a logically partitioned platform, such as logically partitioned platform 610 of FIG. 6.

Logical partitioned platform 710 contains master virtual machines 712, 714, and 716. Master virtual machines 712, 714, and 716 are virtual machines, such as master virtual machine 648 of FIG. 6. The users in a typical business environment typically fall into a few classes, for example, but not limited to, clerks, call center staff, and management. The personal computing needs of the individual members in each of these classes are very similar. Therefore, in a Virtual Desktop environment the virtual machines representing the personal computers of each user in a class are nearly indistinguishable. Each of master virtual machines 712, 714, and 716 corresponds to a different class of users having different personal computing needs.

Client 718 is one of clients 614, 616, and 618 of FIG. 6. A Client sends virtual machine cloning request 720. Virtual machine cloning request 720 is a virtual machine management operation, such as virtual machine management operations 626 of FIG. 6. Virtual machine cloning request 720 requests a new virtual machine to be allocated.

Virtual machine cloning request 720 includes identification 722 of client 718. Identification 722 indicates which class of users client 718 belongs to. Identification 722, therefore, acts as an instruction directing virtual management server, such as virtual management server 630 of FIG. 6, as to which master virtual machine 712, 714, and 716 to use when creating a virtual machine that is allocated to client 718.

In the present example, identification 722 corresponds to an allocation of master virtual machine 712. Therefore, virtual machine 724 is created from snapshot 726. Snapshot 726 is a snapshot, such as snapshot 646 of FIG. 6, which corresponds to master virtual machine 712. Changes to virtual machine 724, such as changes to log files, registry changes, saves of user files, and the like, are captured in the delta file 728.

In one illustrative embodiment, the delta file begins at a size of 16 megabytes, containing only empty data structures. The size of the delta file grows after the client virtual machine is started as the delta file writes to its allocated memory. For the typical Windows Client operating system, the most dramatic growth happens soon after the first startup when the operating system of the delta file allocates it swap file on the C: drive. This file by default is two times the size of the allocated computer memory, or 512 megabytes if the virtual machine is configured with 256 megabytes of random access memory. After this initial bump, the delta file grows over time as Windows touches more and more of its disk space. For a Master virtual machine with a 16 gigabytes disk and a client virtual machine with a memory size of 256 megabytes may have a delta file that grows to between 1 gigabytes and 2 gigabytes over a typical business day. Thus, the skeleton virtual machine would average to about a 10:1 storage savings over full clones of the master virtual machine.

More specifically, the total storage requirement for the virtual desktop environment can be reduced from:

$$N*S \text{ GB} \tag{Equation 1}$$

to a storage optimized total storage requirement of $$S*(1+N*p)+N*M \text{ GB} \tag{Equation 2}$$

Wherein:

S is the size in gigabytes of the virtual machine image;

p is the fraction of a virtual machine's storage device blocks that are modified within the lifetime of the virtual machine;

N is the number of deployed virtual machines; and

M is the size in gigabytes of the metadata associated with the delta file.

Figure 8:
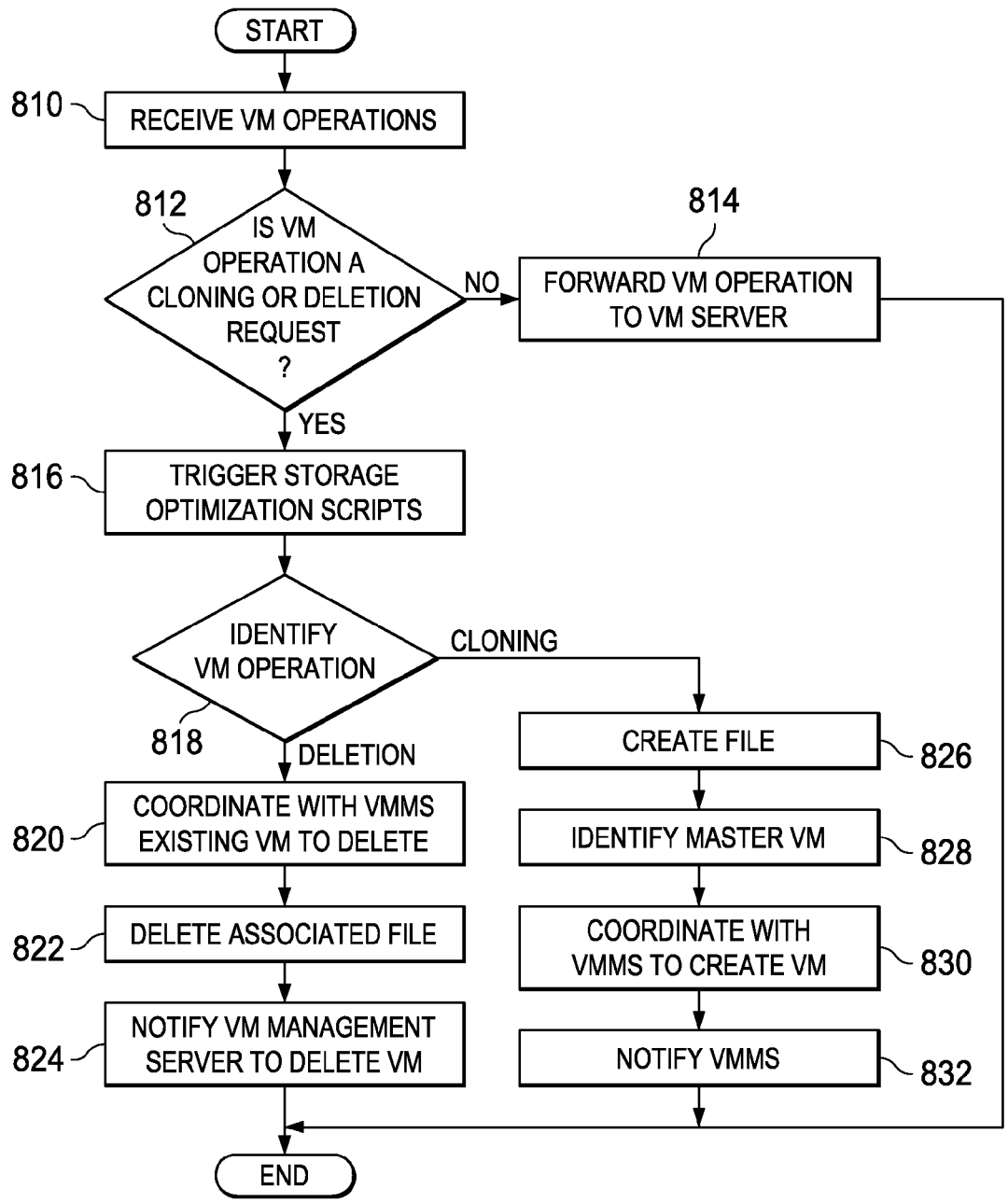
FIG. 8 is a flowchart depicting the process steps for the cloning of a new virtual desktop shown according to an illustrative embodiment.

Referring now to FIG. 8, a flowchart depicting the process steps for the cloning of a new virtual desktop is shown according to an illustrative embodiment. Process 800 is a software process, executing on a software process, such as control application proxy implementation 628 of FIG. 6.

Process 800 begins by receiving a virtual machine management operation (step 810), such as virtual machine management operations 626 of FIG. 6. Responsive to receiving the virtual machine management operation, process 800 identifies whether the virtual machine management operation is a virtual machine cloning or deletion request (step 812).

If the virtual machine management operation is not identified as a virtual machine cloning or deletion request ("no" at step 812), process 800 forwards the virtual machine management operation to the virtual machine management server for further processing (step 814), with the operation terminating thereafter.

If the virtual machine management operation is identified as a virtual machine cloning or deletion request ("yes" at step 812), process 800 triggers the execution of storage optimization scripts (step 816), which can be storage optimization scripts 634 of FIG. 6. The virtual machine management operation is then identified as either a creation or deletion of a virtual machine (step 818).

Responsive to identifying that the virtual machine management operation is a deletion ("deletion" at step 818), process 800 coordinates with the virtual machine management server to delete an existing virtual machine from a logical partitioned platform (step 820). Process 800 deletes the associated delta file (step 822), and then notifies the virtual machine management server to delete the virtual machine (step 824), with the process terminating thereafter.

Returning now to step 818, Responsive to identifying that the virtual machine management operation is a creation ("creation" at step 818), process 818 coordinates with the virtual machine management server to clone a new virtual machine in the logical partitioned platform (step 820). Process 800 creates a new delta file (step 826), and then notifies the virtual machine management server to create the new virtual machine (step 828), with the process terminating thereafter.

The virtual machine management server then creates a skeleton virtual machine, such as virtual machine 620, 622, and 624 of FIG. 6. The new delta file is associated with the new virtual machine and captures writes to the new virtual machine.

Figure 9:
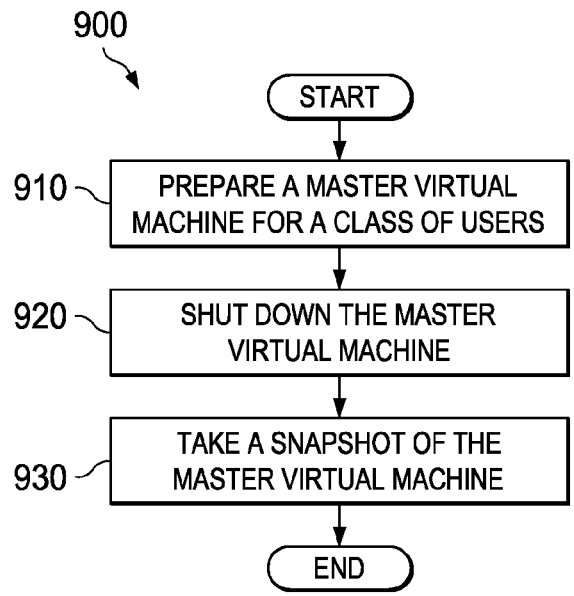
FIG. 9 is a process for setting up a virtual machine environment to share a single base disk image among many virtual machines with each having its own delta file to collect the virtual machine unique changes shown according to an illustrative embodiment.

Referring now to FIG. 9, a process for setting up a virtual machine environment to share a single base disk image among many virtual machines with each having its own delta file to collect the virtual machine unique changes is shown according to an illustrative embodiment. Process 900 is a software process executing on a virtual management server, such as virtual management server 630 of FIG. 6, in conjunction with a logical partitioned platform, such as logical partitioned platform 610 of FIG. 6.

Process 900 begins by preparing a master virtual machine for a class of users (step 910). The master virtual machine can be master virtual machine 648 of FIG. 6. Preparing the master virtual machine can include, but is not limited to, patching, and configuring the operating system and applications included in the master virtual machine which are needed by this class of users.

Process 900 then shuts down the master virtual machine (step 920). To prevent any changes from occurring to the master virtual machine, the master virtual machine is shut down.

Process 900 then takes a snapshot of the master virtual machine (step 930), with the process terminating thereafter. The snapshot can then be used to create skeleton virtual machines, such as virtual machines 620, 622, and 624 of FIG. 6 that can then be created from the snapshot. Snapshot 414 is a preserved state of a master virtual machine, and typically includes the state of the master virtual machine's disks, the contents of the master virtual machine's memory, and the master virtual machine settings, as well as the boot disk image and bootable files of the master virtual machine.

Any skeleton virtual machine that is created from the master virtual machine is similar to the master virtual machine, except that a skeleton virtual machine does not contain a boot disk or bootable files. Instead of reading from a boot disk or bootable files contained in local memory allocated specifically to the skeleton virtual machine, the skeleton virtual machine reads the boot disk image and bootable files from the created snapshot.

Figure 10:
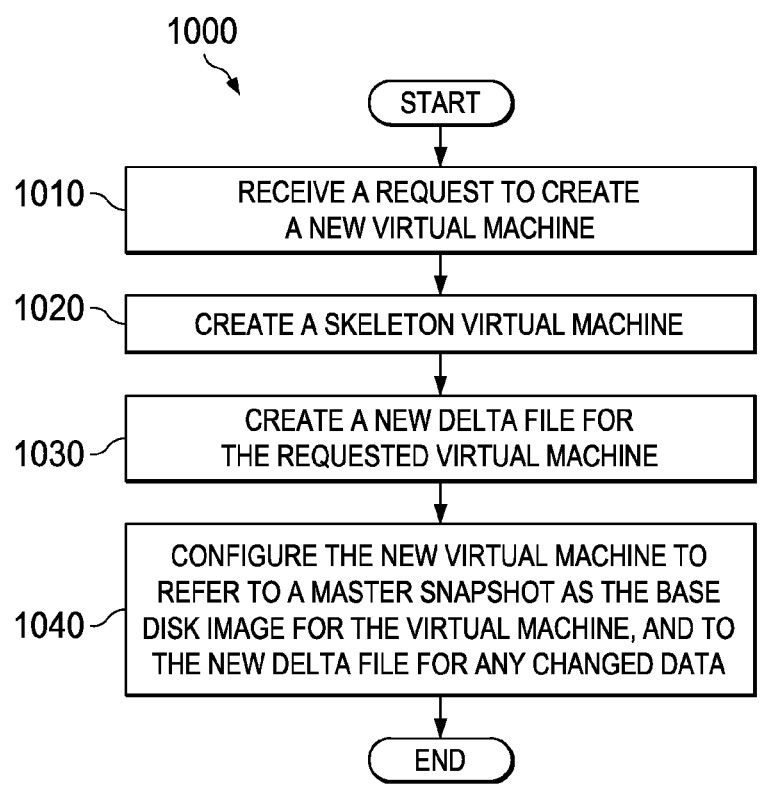
FIG. 10 is a process for creating a new virtual machine shown according to an illustrative embodiment.

Referring now to FIG. 10, a process for creating a new virtual machine is shown according to an illustrative embodiment. Process 1000 is a software process executing on a virtual management server, such as virtual management server 630 of FIG. 6, in conjunction with a logical partitioned platform, such as logical partitioned platform 610 of FIG. 6.

Process 1000 begins by receiving a request to create a new virtual machine (step 1010). Responsive to receiving the request, process 1000 creates a skeleton virtual machine (step 1020). The skeleton virtual machine is a virtual machine, such as virtual machines 620, 622, and 624, which do not contain a boot disk or bootable files.

Process 1000 then creates a new delta file for the requested virtual machine (step 1030). In one illustrative embodiment, the new delta file can be copied from a master virtual machine delta file. The new delta file can be delta file 424 of FIG. 4. The new delta file is initially empty. The new delta file takes up little or no real physical storage. The new delta file contains only those changes which a local virtual desktop has made to its file system, and is typically a small fraction of the size of the master virtual machine.

Process 1000 then configures the new virtual machine to refer to a master snapshot as the base disk image for the virtual machine, and to the new delta file for any changed data (step 1040), with the process terminating thereafter. Since the virtual machine preferentially refers to the delta file, the virtual machine reads the latest versions of data which has changed since the snapshot from the delta file and read data which has not changed since the snapshot from the original disk image. Since the original initial snapshot disk image of the virtual machine does not change after the initial snapshot, it is easy to extend this model to many virtual machines sharing a single base initial snapshot disk image, with each virtual machine having its own delta file to collect that virtual machine's unique changes.

The illustrative embodiments provide computer implemented methods, computer program products, and data processing systems for provisioning new virtual machines in a virtual desktop environment. The users in a typical business environment typically fall into a few similar classes. The personal computing needs of the individual members in each of these classes are very similar. Therefore, in a Virtual Desktop environment the virtual machines representing the personal computers of each user in a class are nearly indistinguishable. However, each of these personal computers needs a multi-gigabyte disk to store the operating system, applications, and data for the user. The bulk of the data stored on these disks are identical representing the operating system and application text which is the same for all the members of a class. The illustrative embodiments disclosed herein use a virtual machine snapshot capability of the underlying virtualization environment to allow all the members of a single class of users to share a single copy of those portions of their boot disk, typically the /C: drive, which are the same.

A snapshot is taken of a master virtual machine. The master virtual machine is not running when the snapshot is taken. At the time of the snapshot, the boot disk image of that master virtual machine is made read-only in a state at the time of the snapshot.

When a client virtual machine is subsequently created, all changes to the virtual machine image, such as changes to log files, registry, user files, and the like, become necessary. These changes are captured in the delta file so that the changes do not alter the initial state of the original snapshot disk image. The original initial snapshot disk image, therefore, remains fixed in its initial state as of the time of the snapshot.

Since the virtual machine preferentially refers to the delta file, the virtual machine reads the latest versions of data which has changed since the snapshot from the delta file and read data which has not changed since the snapshot from the original disk image. Since the original initial snapshot disk image of the virtual machine does not change after the initial snapshot, it is easy to extend this model to many virtual machines sharing a single base initial snapshot disk image, with each virtual machine having its own delta file to collect that virtual machine's unique changes.

Setting up the master virtual machine environment is initially performed in a series of steps. The master virtual machine is prepared for each class of users. This preparation can include, but is not limited to, installing, patching, and configuring the operating system and applications needed by this class of users. The Master virtual machine is then shut down, and an initial snapshot is taken of the virtual machine.

A new client Virtual Desktop virtual machine can then be cloned from the Master virtual machine. A skeleton virtual machine is initially created. The skeleton virtual machine has an initial configuration like the Master virtual machine with the exception that the skeleton virtual machine does not yet contain a boot disk. The Master virtual machine delta file is copied to the new client virtual machine. The client virtual machine is then configured to refer to the Master virtual machine initial snapshot disk image as the client virtual machine's base disk image and to the copied Delta file as the client virtual machine's delta file image.

The new client virtual machine now uses the Master virtual machine's initial snapshot disk image for reads and uses the client virtual machine's own local Delta file for writes. Thus, all new client virtual machines made with this technique is unique as to their respective Delta files. However, a client virtual machine will share all other data that has not been written to the respective Delta file of that client virtual machine with every other client virtual machine and with the Master virtual machine.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for cloning virtual machines in a virtual desktop environment, the method comprising:
   intercepting a request to clone a new virtual machine, wherein the request was initially sent to a virtual management server;
   responsive to intercepting the request, creating a delta file for the new virtual machine;
   cloning the new virtual machine from a master virtual machine, wherein the new virtual machine is a skeleton virtual machine that does not contain a boot disk or bootable files;
   configuring the new virtual machine to read the boot disk and the bootable files from a snapshot of the master virtual machine during a boot of the new virtual machine; and
   configuring the new virtual machine to write data to the delta file.

2. The computer implemented method of claim 1, wherein the step of creating a delta file further comprises:
   creating an initially empty delta file, wherein the initially empty delta file grows after the new virtual machine is started.

3. The computer implemented method of claim 2, wherein the initially empty delta file is an initially empty database having a size of 16 megabytes.

4. The computer implemented method of claim 1, further comprising:
   configuring the new virtual machine to preferentially read data from the delta file, and to read the data from the snapshot when the data is not present in the delta file, such that the new virtual machine will always read a latest version of the data.

5. The computer implemented method of claim 1, wherein the request to clone a new virtual machine includes an identification of a user class, the method further comprising:
   identifying the master virtual machine from a plurality of master virtual machines, wherein each of the plurality of master virtual machines corresponds to a different one of a plurality of user classes.

6. The computer implemented method of claim 1, wherein the intercepting step further comprises:
   intercepting, at a command application proxy interface, the request to clone a new virtual machine, wherein the request was initially sent to a virtual management server; and
   translating, by the command application proxy interface, virtual machine clone commands from the virtual management server into virtual machines and delta files.

7. A computer implemented method for provisioning virtual machines in a virtual desktop environment, the method comprising:
   associating a new virtual machine with a delta file, wherein the new virtual machine is a skeleton virtual machine that does not contain a boot disk or bootable files;
   associating the new virtual machine with a snapshot of a master virtual machine to read the boot disk and the bootable files from the snapshot during a boot of the new virtual machine, wherein the master virtual machine contains the boot disk and the bootable files for the new virtual machine;
provisioning the new virtual machine in a logical partitioned platform of a data processing system.

8. The computer implemented method of claim 7, wherein the step of associating the new virtual machine with the delta file further comprises:
associating the new virtual machine with an initially empty delta file, wherein the initially empty delta file grows after when the new virtual machine is started.

9. The computer implemented method of claim 8, wherein the initially empty delta file is an initially empty database having a size of 16 megabytes.

10. The computer implemented method of claim 7, further comprising:
configuring the new virtual machine to preferentially read data from the delta file, and to read the data from the snapshot when the data is not present in the delta file, such that the new virtual machine will always read a latest version of the data.

11. The computer implemented method of claim 7, wherein the snapshot of the master virtual machine is one of a plurality of snapshots of a plurality of master virtual machines, and wherein the step of associating the new virtual machine with the snapshot of the master virtual machine further comprising:
associating the new virtual machine with the snapshot of the master virtual machine, wherein the master virtual machine corresponds to a certain user class.

12. A computer program product comprising:
a computer readable hardware memory having computer usable program code for cloning virtual machines in a virtual desktop environment, the computer program product comprising:
computer usable program code for intercepting a request to clone a new virtual machine, wherein the request was initially sent to a virtual management server;
computer usable program code, responsive to intercepting the request, for creating a delta file for the new virtual machine;
computer usable program code for cloning the new virtual machine from a master virtual machine, wherein the new virtual machine is a skeleton virtual machine that does not contain a boot disk or bootable files;
computer usable program code for configuring the new virtual machine to read the boot disk and the bootable files from a snapshot of the master virtual machine during a boot of the new virtual machine; and
computer usable program code for configuring the new virtual machine to write data to the delta file.

13. The computer program product of claim 12, wherein the computer usable program code for creating a delta file further comprises:
computer usable program code for creating an initially empty delta file, wherein the initially empty delta file grows after the new virtual machine is started.

14. The computer program product of claim 13, wherein the initially empty delta file is an initially empty database having a size of 16 megabytes.

15. The computer program product of claim 12, further comprising:
computer usable program code for configuring the new virtual machine to preferentially read data from the delta file, and to read the data from the snapshot when the data is not present in the delta file, such that the new virtual machine will always read a latest version of the data.

16. The computer program product of claim 12, wherein the request to clone a new virtual machine includes an identification of a user class, the method further comprising:
computer usable program code for identifying the master virtual machine from a plurality of master virtual machines, wherein each of the plurality of master virtual machines corresponds to a different one of a plurality of user classes.

17. The computer program product of claim 12, wherein the computer usable program code for intercepting step further comprises:
computer usable program code for intercepting, at a command application proxy interface, the request to clone a new virtual machine, wherein the request was initially sent to a virtual management server; and
computer usable program code for translating, by the command application proxy interface, virtual machine clone commands from the virtual management server into virtual machines and delta files.

18. A data processing system comprising:
a bus;
a communications unit connected to the bus;
a storage device connected to the bus, wherein the storage device includes computer usable program code for cloning virtual machines in a virtual desktop environment; and
a processor unit connected to the bus, wherein the processor unit executes the computer usable program code to intercept a request to clone a new virtual machine, wherein the request was initially sent to a virtual management server, responsive to intercepting the request, to create a delta file for the new virtual machine, to clone the new virtual machine from a master virtual machine, wherein the new virtual machine is a skeleton virtual machine that does not contain a boot disk or bootable files, to configure the new virtual machine to read the boot disk and the bootable files from a snapshot of the master virtual machine during a boot of the new virtual machine, and to configuring the new virtual machine to write data to the delta file.

19. The data processing system of claim 18, wherein the processor unit executing the computer usable program code to create a delta file further comprises:
the processor unit executing the computer usable program code to create an initially empty delta file, wherein the initially empty delta file grows after the new virtual machine is started.

20. The data processing system of claim 19, wherein the initially empty delta file is an initially empty database having a size of 16 megabytes.

21. The data processing system of claim 18, wherein the processor unit further executes the computer usable program code:
to configure the new virtual machine to preferentially read data from the delta file, and to read the data from the snapshot when the data is not present in the delta file, such that the new virtual machine will always read a latest version of the data.

22. The data processing system of claim 18, wherein the computer usable program code to clone a new virtual machine includes an identification of a user class, wherein the processor unit further executes the computer usable program code:
to identify the master virtual machine from a plurality of master virtual machines, wherein each of the plurality of master virtual machines corresponds to a different one of a plurality of user classes.

23. The data processing system of claim 18, wherein the processor unit executing the computer usable program code for intercepting the request to clone a new virtual machine step further comprises:
wherein the processor unit executing computer usable program code to intercept, at a command application proxy interface, the request to clone a new virtual machine, wherein the request was initially sent to a virtual management server, and to translate, by the command application proxy interface, virtual machine clone commands from the virtual management server into virtual machines and delta files.

24. A data processing system comprising:
a bus;
a communications unit connected to the bus;
a storage device connected to the bus, wherein the storage device includes computer usable program code for provisioning virtual machines in a virtual desktop environment; and: a processor unit connected to the bus, wherein the processor unit executes the computer usable program code to associate a new virtual machine with a delta file, wherein the new virtual machine is a skeleton virtual machine that does not contain a boot disk or bootable files, to associate the new virtual machine with a snapshot of a master virtual machine to read the boot disk and the bootable files from the snapshot during a boot of the new virtual machine, wherein the master virtual machine contains the boot disk and the bootable files for the new virtual machine, and to provision the new virtual machine in a logical partitioned platform of a data processing system.

25. The data processing system of claim 24, wherein the snapshot of the master virtual machine is one of a plurality of snapshots of a plurality of master virtual machines, and wherein the processor unit further executes the computer usable program code:
to associate the new virtual machine with the snapshot of the master virtual machine, wherein the master virtual machine corresponds to a certain user class.

* * * * *